Patented Nov. 30, 1937

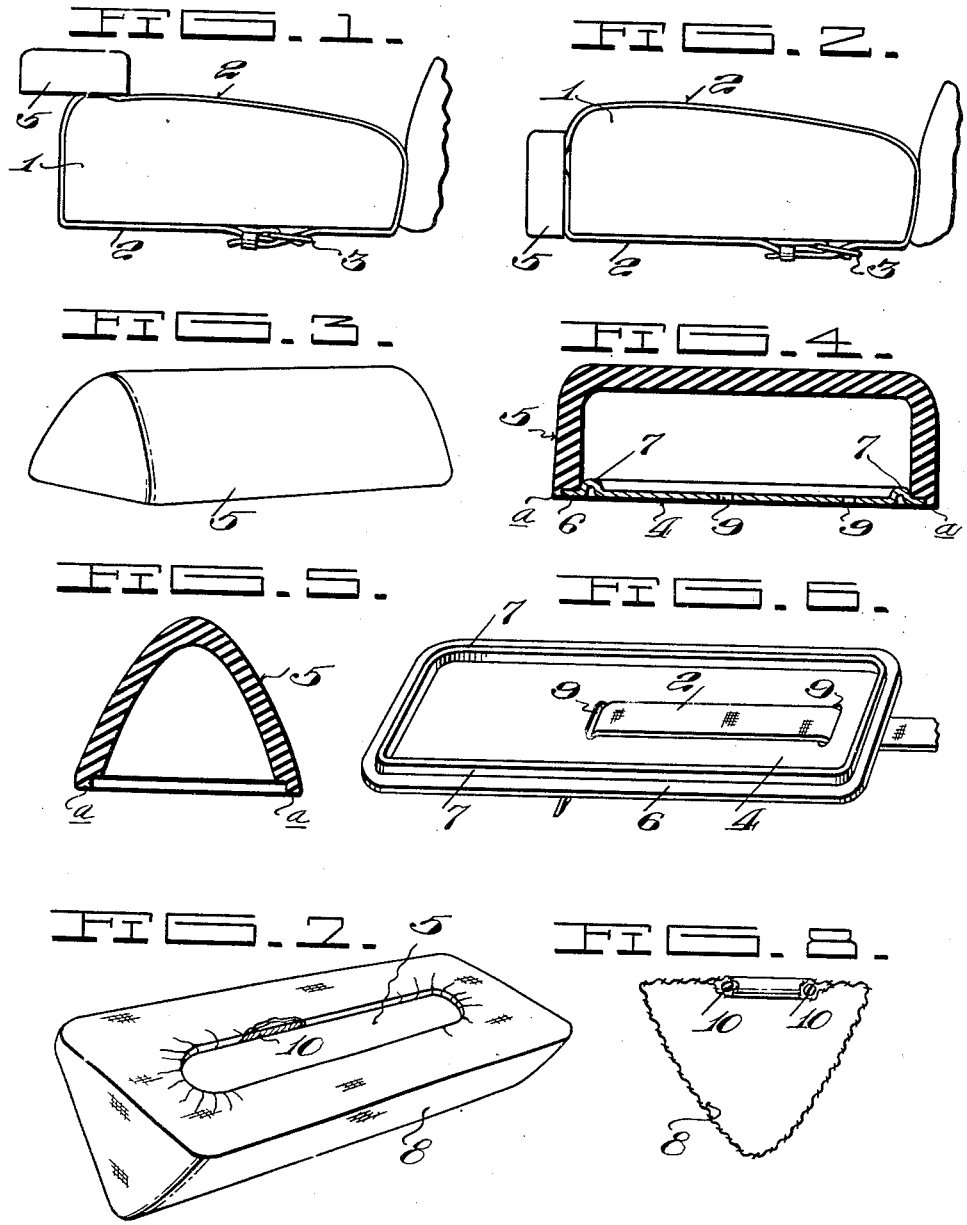

2,100,737

UNITED STATES PATENT OFFICE 2,100,737

KNEE REST FOR VEHICLE SEATS

Walter W. Foster, Wichita Falls, Tex.

Application March 18, 1935, Serial No. 11,642

3 Claims. (Cl. 155—165)

This invention relates to vehicle seats and it has particular reference to leg rests for the comfort of the operators of automobiles.

The principal object of the invention is to provide means adapted to be constructed upon or adjustably secured to the cushion of an automobile seat against which the driver may rest the side of his knee, affording him comfort especially when driving for a considerable period of time over long distances. The strain of maintaining the leg in an upright position with nothing against which to rest the knee is quite tiresome and it is the aim of the present invention to provide means to alleviate this strain without interfering with the normal operation of a vehicle nor movements therein of the occupants such as getting into and out of the vehicle.

Another object of the invention is to provide for ready removal and replacement of the device, together with means, readily removable for laundering, to cover the device proper to protect wearing apparel against becoming soiled.

With the foregoing objects as paramount, the invention has particular reference to certain salient features of construction and arrangement of parts which will become manifest as the description proceeds, taken in connection with the accompanying drawing, wherein:—

Figure 1 is an elevational view of a vehicle seat cushion with the back broken away, showing one position of the invention thereon.

Figure 2 is a view similar to Figure 1 showing an adjusted position of the invention.

Figure 3 is a perspective view of the leg rest.

Figure 4 is a longitudinal section through the center of the leg rest showing its base or mounting.

Figure 5 is a transverse section of the leg rest.

Figure 6 is a perspective view of the base or mounting per se.

Figure 7 is a perspective view of the underside of the leg rest showing the manner in which the removable cover is secured thereto, and Figure 8 is a transverse section of the cover.

Continuing with a more detailed description of the drawing, reference is primarily made to Figures 1 and 2 in which the cushion 1 is shown as being surrounded by a strap 2 of leather, fabric or the like and secured by a buckle or other adjustable fastening means 3.

A base or mounting 4 is provided to receive the knee rest 5 and, as shown in Figure 6, has a flange 6 and a rib 7, the latter lying inwardly of the skirt portion $a$ of the leg rest 5. It will be noted that the skirt portion $a$ is recessed to receive the flange 6 of the base 4, the rib 7 functioning as a stop.

The knee rest may be cemented or otherwise secured to the base portion if it is found that the cover 8 is insufficient for holding the elements together when applied in the manner shown in Figure 7.

In Figure 6 the base 4 is shown as having slots 9 therein through which is passed the retaining strap 2. Obviously, the base may be slid on the strap without displacing or removing the latter. This feature enables the vehicle driver to adjust the position of the knee rest 5 to any desired position or to a position where it will be entirely out of the way when entering or leaving the vehicle.

It is preferred that the knee rest per se be constructed of rubber or similar resilient material so as to yield to normal leg movements in driving a machine and yet remain fixed in relation to the seat. This flexibility prevents undue friction on the leg and wear upon the garments as well as affording as it does a comfortably soft resistance when the leg of the driver tires.

To insure protection of the garments of the driver and a means for maintaining a neat appearance of the device, the cover 8 is constructed with an elastic contracting means or draw string 10 by which the cover is drawn closely over the knee rest 5. It is apparent that this cover may be readily removed for laundering and other purposes without disturbing the other elements of the combination.

From the foregoing, it is apparent that the strain caused by maintaining the leg upright when driving over long distances may be overcome by the use of the invention.

Manifestly, the construction shown is capable of considerable modification and such modification as is considered within the scope and meaning of the appended claims is also considered within the spirit and intent of the invention.

What is claimed is:

1. A knee rest for a vehicle seat cushion comprising a body of sponge-like material of greater length than width having a side surface upwardly inclined toward its center adapted to support the side of the knee and a flat bottom side disposed upon the surface of said cushion the length of the body extending transversely of the cushion, a strap transversely embracing said cushion, means secured to said body and interposed between said body and said seat cushion to slidably connect said body with said strap whereby said body will be capable of displacement along its longitudinal axis and removable means enclosing said body.

2. A leg and knee rest for vehicle seat cushions comprising a resilient body of greater length than width having its length extending transversely of the cushion and, having a side surface upwardly inclined toward the center thereof to support the knee and further having a removable cover, a base of the same shape secured to the bottom of said body and having a flat surface disposed to lie flush upon the surface of said cushion and capable of longitudinal sliding movement thereon and means transversely embracing said cushion having longitudinal sliding connection with said base.

3. A leg and knee rest for seat cushions comprising a resilient element of greater length than width having its length extending transversely of the cushion and, whose upper portion is provided with a side surface upwardly inclined toward its center to support the knee, a removable cover thereon, a base plate of the same shape secured to the bottom of said element, and means transversely embracing said seat cushion for retaining said base plate in flush and longitudinal sliding relationship thereof transversely with respect to said seat cushion.

WALTER W. FOSTER.